United States Patent
Foley, Sr. et al.

(10) Patent No.: US 9,233,527 B2
(45) Date of Patent: Jan. 12, 2016

(54) SYSTEM AND METHOD FOR MAKING LAMINATED SHEETS

(71) Applicant: Klöckner Pentaplast of America, Inc., Gordonsville, VA (US)

(72) Inventors: Stephen P. Foley, Sr., Waynesville, OH (US); Teddy L. Cradlebaugh, Germantown, OH (US); William J. Crawford, III, Springboro, OH (US)

(73) Assignee: Klöckner Pentaplast of America, Inc., Gordonsville, VA (US)

(*) Notice: Subject to any disclaimer, the term of this patent is extended or adjusted under 35 U.S.C. 154(b) by 0 days.

(21) Appl. No.: 14/301,435

(22) Filed: Jun. 11, 2014

(65) Prior Publication Data

US 2014/0290825 A1 Oct. 2, 2014

Related U.S. Application Data

(62) Division of application No. 12/955,129, filed on Nov. 29, 2010, now Pat. No. 8,800,626.

(51) Int. Cl.
*B32B 41/00* (2006.01)
*B32B 37/00* (2006.01)
(Continued)

(52) U.S. Cl.
CPC .............. *B32B 41/00* (2013.01); *B32B 37/0015* (2013.01); *B32B 37/10* (2013.01);
(Continued)

(58) Field of Classification Search
CPC B32B 37/0015; B32B 37/10; B32B 38/0004; B32B 41/00; B32B 2425/00; Y10T 156/1028; Y10T 156/12; Y10T 156/17
USPC .................... 156/64, 351, 361, 378, 510, 538
See application file for complete search history.

(56) References Cited

U.S. PATENT DOCUMENTS 3,623,933 A 11/1971 Staats
3,661,703 A 5/1972 Shelor
(Continued)

FOREIGN PATENT DOCUMENTS

DE 19807139 A1 9/1999
GB 2 137 597 A 10/1984
GB 2 228 255 A 8/1990

OTHER PUBLICATIONS

Partial International Search Report for International Application No. PCT/US2011/062392 dated Mar. 1, 2012.
(Continued)

*Primary Examiner* — George Koch
(74) *Attorney, Agent, or Firm* — Marshall, Gerstein & Borun LLP

(57) ABSTRACT

A laminating system and a method of making a laminated product can include a roll of substrate material and a roll of film material to be laminated together to form a laminate. The system includes a sheeter station and, optionally, a breaker bar station and/or a registration station. The sheeter station is configured to cut the laminate at desired locations based on either signals received from the registration station or other system components. The breaker bar station is configured to remove any roll set curl that may reside in the laminate as a result of the substrate and/or film materials being fed to the system directly from rolls. The registration station is arranged, during an automated registration mode, to detect markings on the laminate and instruct the sheeter station to cut the laminate into individual sheets for subsequently processing into cards such as credit cards, gift cards, ID cards, etc.

13 Claims, 3 Drawing Sheets

(51) Int. Cl.
*B32B 37/10* (2006.01)
*B32B 38/00* (2006.01)

(52) U.S. Cl.
CPC ......... *B32B38/0004* (2013.01); *B32B 2425/00* (2013.01); *Y10T 156/1028* (2015.01); *Y10T 156/12* (2015.01); *Y10T 156/17* (2015.01)

(56) References Cited

U.S. PATENT DOCUMENTS

| | | |
|---|---|---|
| 3,889,939 A | 6/1975 | Faltin |
| 4,069,081 A | 1/1978 | Drower et al. |
| 4,960,484 A | 10/1990 | King et al. |
| 4,971,646 A | 11/1990 | Schell et al. |
| 5,199,341 A | 4/1993 | Jones |
| 5,518,569 A | 5/1996 | Achilles et al. |
| 5,738,748 A | 4/1998 | Mitchell, Jr. |
| 5,783,024 A | 7/1998 | Forkert |
| 5,817,205 A | 10/1998 | Kaule |
| 6,153,298 A | 11/2000 | Joson |
| 6,489,038 B1 | 12/2002 | Sperlich et al. |
| 6,491,782 B1 | 12/2002 | Jaynes |
| RE38,553 E | 7/2004 | Maynard et al. |
| 6,941,782 B2 | 9/2005 | Travis et al. |
| 7,544,266 B2 | 6/2009 | Herring et al. |
| 2003/0089444 A1 | 5/2003 | Melzer et al. |
| 2003/0116633 A1 | 6/2003 | Clayman et al. |

OTHER PUBLICATIONS

International Search Report and Written Opinion for Application No. PCT/US2011/062392 dated May 16, 2012.
Office Action for U.S. Appl. No. 12/955,129 dated May 10, 2013.
Office Action for U.S. Appl. No. 12/955,129 dated Jan. 6, 2014.

SYSTEM AND METHOD FOR MAKING LAMINATED SHEETS

CROSS-REFERENCE TO RELATED APPLICATION

This is a divisional of U.S. patent application Ser. No. 12/955,129, filed Nov. 29, 2010, now U.S. Pat. No. 8,800,626, which is hereby incorporated by reference herein.

FIELD OF THE DISCLOSURE

The present disclosure relates to systems and methods for producing individual laminated sheets and, more particularly, to machines and methods for producing individual laminated sheets using a roll-to-roll laminating system and process.

BACKGROUND

Laminated sheets and cards are used in many industries for many purposes. Typical uses of laminated sheets include packaging, banners, decorative/informational signs, point of purchase displays and the like. Typical uses of laminated cards made from these sheets include credit cards, driver's licenses, ID cards, phone cards, gift cards, loyalty cards, game cards, key cards and the like. These laminated sheets and cards are constructed from multiple layers of plastic or paper based substrates, holographic, metalized, printed or clear films or foils, and adhesives and coatings. These laminated cards also usually include printing, graphics, and/or other features such as security elements. Such laminated sheets are typically manufactured using roll-to-roll or sheet-to-roll laminating processes. Conventional examples of a sheet-to-roll laminating process can be performed by machines such as the Billhofer EK laminator, a D&K Group, Inc. laminator, a GBC laminator, and a Steinemann laminator, for example. One particular sheet-to-roll laminating machine and process is described in U.S. Pat. No. 7,544,266 to Herring et al. Conventional examples of a roll-to-roll laminating process can be performed by machines such as an Egan coater/laminator, a Faustel coater/laminator, and a Black Clawson coater/laminator, for example.

U.S. Pat. No. 7,544,266 describes that difficulties arise in the production of laminated cards using the conventional roll-to-roll process because the cards must ultimately meet certain standards, such as with respect to peel strength or resistance to delamination. Further, according to Herring et al., defects such as bubbles or wrinkles between layers, and warping, curling or bowing of the final laminated cards may occur during or after the manufacturing process. Warping may occur as a result of a roll laminating process wherein rolls of material constituting each layer are adhered together as they are unrolled, coated, and fed into a lamination press with unbalanced tension. Further, Herring et al. describe that conventional roll-to-roll laminating requires the heavier plastic materials to be stored on wound rolls and thus they tend to take on roll set curl (i.e., a memory of having been wound up into a coil).

A balanced, symmetrical construction is optimal in order to prevent curling or bowing in the finished cards. Thus, even if only one side of the card requires a laminated film, such as a metalized film or diffraction surface, the opposite side of the composite construction should have a matching film type (though may be clear, printed, metalized, etc.). Accordingly, one such known card laminate comprises a split core substrate of two adjacent layers of 12 mil (300 micron) white PVC copolymer substrate. Laminated to one side of each of the PVC split cores is 0.48 gauge (12 microns), 0.60 gauge (15 microns), 0.75 gauge (19 micron), or 0.92 gauge (23 micron) PET holographic, metalized, brushed, coated, printed or clear film, with or without tie coat. A tie coat or primer may be used to improve the bond between the adhesive and the metalized surface of the film. This lamination involves a roll to roll lamination process using a conventional water-based adhesive, for example.

The resulting laminate is then sheeted off-line in a process whereby sections of the laminate are cut to a desired length, for example, to a size of 24"×28.5" or 24.75"×29", for example, and then using a guillotine or other cutting method to square the sheet. Registration of the holographic imagery to the sheet is not conventionally instrument controlled or automated. These sheets are next printed, and then fused back to back with two adhesive coated 2 mil (50 micron) PVC overlays on top and bottom to form the outer skins in a second and final lamination step, which is typically performed by the card manufacturer. The printed sheets are then reduced to card size in any manner known in the art. Features such as signature panels, holograms and/or decorative foils are often applied to the individual cards as required or desired. These cards are then embossed on standard personalization equipment.

The above-described card laminate and process of producing the same has many benefits, such as heat resistant holography and metallization, bright holography, stable oriented PET, excellent bond strength of coatings to PET to prevent delamination, and tie coat on metal to improve bond between adhesive and metal. However, the above described card laminate and process of producing the same has many drawbacks as well. For example, according to Herring et al., PVC in roll form possesses roll set curl which causes sheet curl and rippled edges, and PVC in roll form may limit certain product constructions. As such, Herring et al. describe that the roll-to-roll laminating process requires specialty sheeting to achieve registered imagery, heavier adhesive coat weights that can create visual defects, and final lamination cycle required to activate adhesive and achieve peel strength requirements for the typical end uses, such as ANSI/ISO specifications. In order to alleviate the known problems with roll-to-roll laminating processes, Herring et al. describe a process that introduces the heavier plastic materials as flattened individual sheets. In the sheet-to-roll lamination process described by Herring et al., the thinner films can be supplied on rolls, while the heavier plastic sheets are supplied from a stack and are individually inserted into the process to be laminated by the film or films. This assertedly reduces and/or eliminates roll-set-curl and overcomes the problems and disadvantages of roll-to-roll systems.

While sheet-to-roll processes such as that disclosed by Herring et al. can substantially reduce and/or eliminate roll set curl, they are susceptible to other inefficiencies. For example, when the individual sheets are loaded into the process and laminated with the foils or other films, the foils and films are provided from continuous rolls, but the individual sheets are typically loaded in an overlapping arrangement, as depicted in FIG. 1 of the Herring patent discussed above, for example. Accordingly, each individual sheet includes an unlaminated trailing edge portion, which is often referred to as a "gutter" portion. To facilitate further processing, the gutter portion can be trimmed and recycled or otherwise discarded. Trimming and recycling require additional efforts, while discarding is wasteful. Moreover, when the foils or films include markings such as logos, names, holographs, etc., the foils and films must be registered with the individual sheets in order to ensure proper placement of the markings.

Such registration must occur before the film and sheets are laminated because the sheets are pre-cut. Difficulties can arise when registering the pre-cut sheets, however, because they can be prone to dimensional variations and positional misalignments, etc., due to the basic tolerances of the material handling equipment that is conventionally utilized.

SUMMARY

One aspect of the present disclosure includes a laminating system including a substrate supply station, a film supply station, a drive drum, a lamination roller, and an elongate bar. The substrate supply station is adapted to support a roll of substrate material. The film supply station is adapted to support a roll of film material. The drive drum is located downstream from the film supply station and a portion of the second surface of the film material is adapted to travel around the drive drum during a lamination process. The lamination roller is disposed downstream from the substrate supply station and adjacent to the drive drum such as to define a nip between the lamination roller and the drive drum. The nip is adapted to receive the substrate material and the film material during the lamination process. The lamination roller is adapted to apply a pressure to the drive drum during the lamination process to facilitate lamination of the substrate material to the film material to produce a laminate. The elongate bar is disposed downstream of the lamination roller and arranged and configured such that the substrate material of the laminate slidingly engages the elongate bar to thereby curl the laminate around the elongate bar to produce substantially flattened laminate.

Another aspect of the present disclosure provides a laminating system including a substrate supply station, a film supply station, a drive drum, a lamination roller, and a sheeter station. The substrate supply station is adapted to support a roll of substrate material. The film supply station is adapted to support a roll of film material. The drive drum is located downstream from the film supply station and a portion of the film material is adapted to travel around the drive drum during a lamination process. The lamination roller is disposed downstream from the substrate supply station and adjacent to the drive drum such as to define a nip between the lamination roller and the drive drum. The nip is adapted to receive the substrate material and the film material during the lamination process. The lamination roller is adapted to apply a pressure to the drive drum during the lamination process to facilitate lamination of the substrate material to the film material to produce a laminate. The sheeter station is disposed downstream from the lamination roller for cutting the laminate into individual sheets.

Yet another aspect of the present disclosure provides a method of making a laminated product. The method includes moving substrate material from a roll through a nip disposed between a drive drum and a laminating roller, wherein the substrate material has a first surface and a second surface disposed opposite the first surface. Additionally, the method includes moving film material from a roll through the nip, the film material having a first surface and a second surface. Additionally, the method includes applying a force to the substrate material and the film material with the laminating roller as the substrate material and film material move through the nip, thereby facilitating lamination of the first surface of the substrate material to the first surface of the film material to provide a continuous web of laminate. Finally, the method includes bending and sliding the continuous web of laminate around an elongate bar that is disposed downstream from the nip to provide a continuous web of substantially flattened laminate.

A still further aspect of the present disclosure provides a method of making a laminated product, which includes moving substrate material from a roll through a nip disposed between a drive drum and a laminating roller. The substrate material has a first surface and a second surface disposed opposite the first surface. The method additionally includes moving film material from a roll through the nip, wherein the film material has a first surface and a second surface. The method additionally includes applying a force to the substrate material and the film material with the laminating roller as the substrate material and film material move through the nip, thereby facilitating lamination of the first surface of the substrate material to the first surface of the film material to provide a continuous web of laminate. Moreover, the method includes determining when to cut the continuous web of laminate to provide individual sheets of a predetermined dimension; and finally, cutting the continuous web of laminate with a sheeter station to provide individual sheets of the predetermined dimension.

DETAILED DESCRIPTION OF PREFERRED EMBODIMENT(S)

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, express or implied, it is not intended that the scope of any claim element be interpreted based on the application of 35 U.S.C. §112, sixth paragraph.

Figure 1:
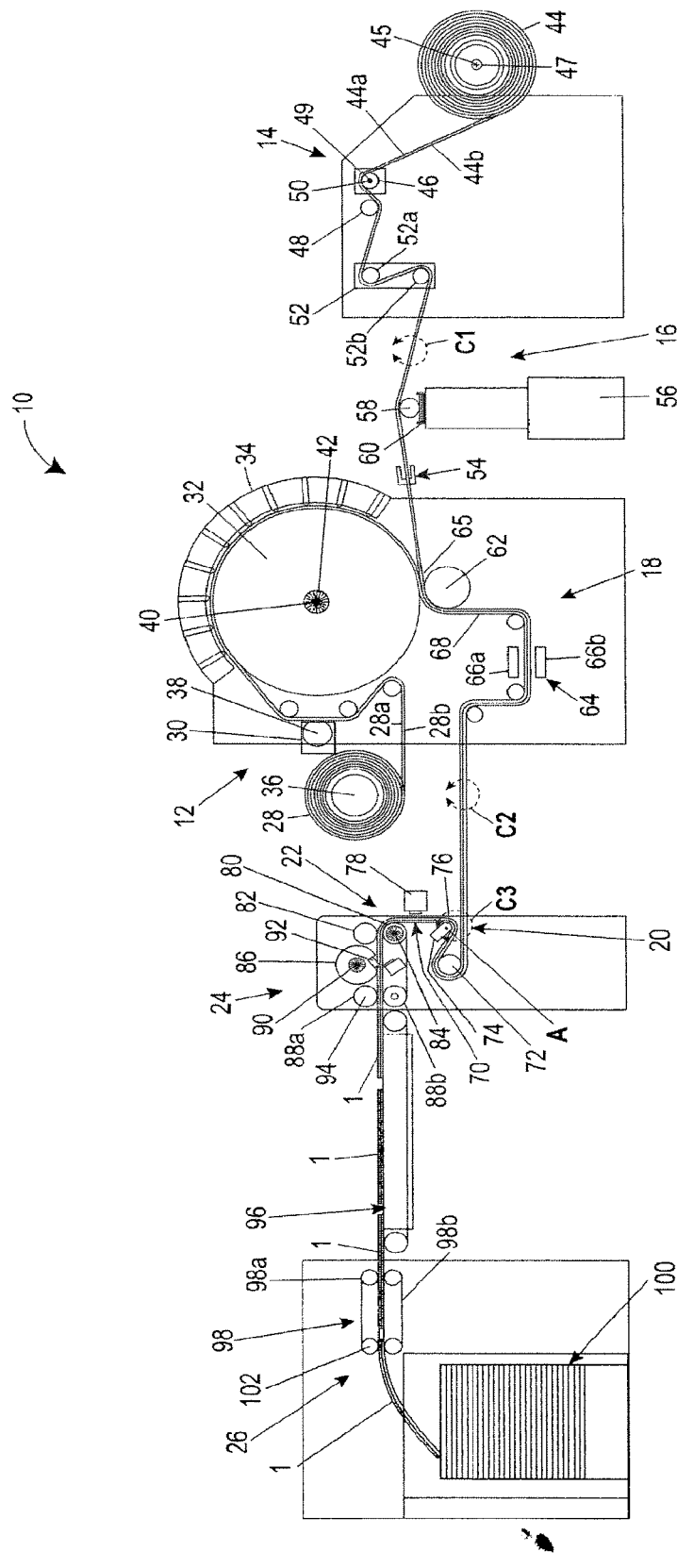
FIG. 1 is a schematic side view of one embodiment of a laminating system constructed in accordance with the principles of the present disclosure.

FIG. 1 is a side schematic representation of one embodiment of a laminating system 10, which can be used to prepare individual sheets of product 1, in accordance with the principles of the present disclosure. The system 10 includes a film supply station 12 adapted to support or supporting a roll of film material 28, a substrate supply station 14 adapted to support or supporting a roll of substrate material 44, an alignment station 16, a lamination station 18, a breaker bar station 20, a registration station 22, a sheeter station 24, and a stacking station 26.

Generally, during operation of the laminating system 10, the film material 28 and the substrate material 44 are simultaneously unrolled from their respective rolls and fed to the lamination station 18 to be laminated together into a continuous web of laminate, which is identified by reference numeral 68 in FIG. 1. The alignment station 16, as will be described in more detail below, ensures that the film material 28 and the substrate material 44 enter the lamination station 18 aligned with each other. After the lamination station 18, the continuous web of laminate 68 passes through the breaker bar station 20, wherein the laminate 68 is bent, curled, or otherwise manipulated to remove any roll set curl that might exist in the laminate 68 due to the film and/or substrate materials 28, 44 being fed into the system 10 directly from their respective storage rolls. Preferably, the breaker bar station 20 ejects laminate 68 having substantially no curl, e.g., substantially flat laminate 68. Upon leaving the breaker bar station 20, the flattened laminate 68 passes through the registration station 22, which can, in an automated registration mode, detect markings carried by the laminate 68 and instruct the sheeter station 24 to cut the laminate 68 into individual sheets 1 having specified dimensions. Alternatively, in a manual registration mode, the sheeter station 24 may be set to cut the laminate 68 into the sheets 1 based on an input desired dimension of the sheets 1. The specific location for each cut can be determined by monitoring various process parameters. In either mode, the individual sheets 1 are then passed to the stacker station 26 and stacked neatly for storage and/or further processing into credit cards, drivers licenses, ID cards, phone cards, gift cards, loyalty cards, game cards, collectors cards, key cards, or generally any other desirable product card or otherwise.

So configured, the system 10 and basic method of the present disclosure advantageously produces flat individual sheets 1, which have been laminated from film and substrate materials 28, 44 provided directly to the system 10 in roll form. Providing the roll stock materials 28, 44 directly to the system 10 increases the overall operating efficiency of the device and reduces and/or minimizes waste. Additionally, as will be described further below, the sheeter station 24 of the disclosed system 10 is configured to ensure that the individual sheets 1 are cut to predetermined dimensions within tight tolerances, thereby improving manufacturing accuracy and producing higher quality product.

Each of the foregoing components of the system 10 and the methods of handling the material of the present disclosure will now be described in more detail.

Referring still to FIG. 1, the film supply station 12 includes the roll of film material 28, as well as a film coating station 30, a drive drum 32, and a drying oven 34. The roll of film material 28 is disposed on a shaft 36 and configured to be pulled by the drive drum 32 and fed to the lamination station 18 during operation of the system 10.

The film material 28 includes a first surface 28a and a second surface 28b that is opposite the first surface 28a. The film material 28 can be a plastic material, a paper material, a metalized material such as foil, or any other natural or synthetic material. In one embodiment, the film material 28 can have a thickness in the range of approximately 0.25 mils (6.35 µm) to approximately 2.0 mils (50.8 µm). In some embodiments the film material 28 can be printed with a pattern or with text, which can include an image such as a holographic image, a logo, a photograph, or otherwise, and/or can be coated with an additional film, layer, or other material.

In some embodiments, the film material 28 can be in a range of approximately 12 µm to approximately 23 µm low haze, heat stable, print treated biaxially oriented PET. However, the film material 28 can have a thickness in a range from approximately 1 µm to approximately 50 µm, or even more. In alternative embodiments, the film material 28 can be, for example, APET, PETG, PBT, OPP, PVC, acrylic, PC, PS, ABS, HIPS, PLA (polylactic acid), and/or co-extruded films. Olefinic films (PP, metallocene catalyzed, etc.) can be used for certain applications not demanding post lamination processes, or requiring ANSI/ISO performance. In other embodiments, specific functional and aesthetic coatings can be applied to the film material 28 to provide desired security features, performance and appearance, for example. The film material 28 can be metalized (vapor deposited metal or other compounds), holographic, brushed, printed (e.g., graphics, logos, indicia, marble, wood grain, etc.), tinted or clear, and may additionally include layered security features.

The film coating station 30 can include a reservoir (not shown) for storing an adhesive, and an applicator 38 for applying a layer of the adhesive to the first surface 28a of the film material 28 as it travels past the film coating station 30. The applicator 38 can include a roller, a sprayer, a bath, or any other conventionally known applicator. The adhesive can include any water-based adhesive capable of serving the principles of the present disclosure. For example, the adhesive can include an aqueous adhesive such as a cross-linked polyurethane copolymer composition, e.g., commercially available Henkel Liofol® solventless laminating adhesive, Dow ROBOND™ L-Water-Based Adhesive for Lamination, or Bayer Dispercoll U-Pur® water-based laminating adhesive. In one embodiment, the film coating station 30 provides a predetermined coat weight in the range of approximately 0.2 pounds per ream to approximately 10 pounds per ream coating on the first surface 28a of the film material 28. Suitable adhesives include any adhesives known in the art to be suitable for lamination of a film layer to a substrate layer, such as adhesives used in conventional sheet-to-roll or roll-to-roll processes. When the adhesive is applied by a coating station 30, preferably a water-based adhesive is used. Such an adhesive can have a peel strength well above the minimum requirement, and is suitably water and chemical resistant, per ANSI/ISO 7810 standards. Where the adhesive is pre-coated onto the film, perhaps a heat seal adhesive, which can be water or solvent based, or extrusion coated, can be used. Alternatively, an adhesive, either water or solvent based, such as a heat seal adhesive, may be precoated onto the film layer, in which case a coating station is not required. While various examples of adhesives have been disclosed, other adhesives can be used, and the operation and effect of the overall system and method of the present disclosure, as defined in the appending claims, is not affected in any way by the specific adhesive used.

Still referring to FIG. 1, the drying oven 34 of the film supply station 12 includes an arc-shaped heating device disposed adjacent to the drive drum 32. As such, the film material 28 carried by the drive drum 32 passes adjacent to or through the drying oven 34 in a manner that enables the oven to heat the water-based adhesive applied by the film coating station 30 to evaporate and remove the water before moving the film material 28 to the lamination station 18. In one embodiment, the drying oven 34 can include an impinged air-drying oven that is either electric or gas fired. In other embodiments, the drying oven 34 can include any other type of oven or heater capable of serving the intended purpose. In still further alternative embodiments, the system 10 may utilize an adhesive that does not require heating and/or evaporation and, as such, the system 10 would not necessarily include a drying oven 34, but rather, the drive drum 32 could deliver the film material 28 directly from the film coating station 30 to the lamination station 18. In still other embodiments, the adhesive can be radiation curable, and in place of drying the adhesive in the oven, the adhesive can be cross-linked by exposing it to a UV light, for example, prior to or after lamination, or by irradiating the sheets with an electron beam ("EB") source after lamination. In yet another embodiment, the film material 28 can be coated in-line with a hot melt adhesive via a hot melt/extrusion die, for example. Accordingly, as mentioned above, the type or method of application of the adhesive is not to be limited to any particularly disclosed adhesive, and the particular adhesive used has no effect on the overall operation and effect of the subject matter recited in the appending claims.

With continuing reference to FIG. 1, the drive drum 32, as shown, includes a generally cylindrical drum disposed on a drive shaft 40 for rotation relative to the drying oven 34 and for pulling the film material 28 from its roll and toward the lamination station 18. The drive shaft 40 can be fixed to the drive drum 32 by a spline connection or other means, for example, and driven by a motor (not shown). Additionally, the drive drum 32 can be equipped with a drum encoder 42 that is configured to monitor the rotational position and/or speed of the drive drum 32, for example, as will be discussed in more detail below, such that the film material 28 is fed to the lamination station 18 at a rate in cooperation with a rate at which the substrate supply station 14 delivers the substrate material 44.

Still referring to FIG. 1, the substrate supply station 14 includes the roll of the substrate material 44, as well as an unwind shaft 45, and a tensioning device 46. The substrate material 44 includes a first surface 44a and a second surface 44b that is opposite the first surface 44a. The substrate material 44 can be a paper material, a plastic material, or any other desired material. In one embodiment, the substrate material 44 can have a thickness in a range of approximately 2 mils to approximately 24 mils, and a maximum width of approximately 40 inches (i.e., 1016 millimeters). For transaction cards, for example, the substrate material 44 can preferably be a 12 mil thick PVC copolymer. However, the substrate material 44 can range from approximately 5 mils thick to approximately 30 mils thick in some applications, especially for other sheet stock to produce other card types, such as ID cards, phone cards, gift cards, loyalty cards, casino cards, etc. The substrate material 44 can be clear, translucent, or colored. Alternate materials can also be used, for example, PVC homopolymer, PET, APET, PETG, PC, PS, ABS, acrylic, olefins such as PE/PP, HIPS, PLA, paper and board stock.

As discussed in the background section set forth above, in some embodiments where the substrate material 44 comprises a heavier material such as a plastic (e.g., polyvinylchloride (PVC)), the substrate material 44 can take on roll set curl. That is, due to the substrate material 44 being stored in a roll, as shown, the material 44 can become deformed and include a curl in a direction corresponding to the direction in which it is rolled. For example, in the disclosed embodiment, in the absence of tension, the substrate material 44 may include a curl C1, as indicated by the arrow in FIG. 1, in a direction toward the first surface of the substrate material 44. At least one embodiment of the system 10 disclosed herein therefore includes facilities to substantially permanently reduce and/or eliminate this curl C1, which if not reduced, can compromise the efficiency of subsequent processing operations. Such facilities are present in the breaker bar station 20, which was mentioned above and will be described in more detail below.

To facilitate processing and supply of the substrate material 44 to the system 10 in a controlled manner, the substrate supply station 14 includes the tensioning device 46 disposed immediately downstream from the roll of substrate material 44 to temporarily reduce and/or eliminate the curl C1. The tensioning device 46 operates to maintain constant tension of the substrate material 44 as it is removed from the unwind shaft 45. In one embodiment, the unwind shaft 45 can be driven by a motor (not shown) and can have an unwind encoder 47 or other means, for example, for detecting the rotational speed and/or position of the unwind shaft 45 to facilitate control of the system 10, as will be discussed further below. The tensioning device 46 includes a tension roller 50 and an idler roller 48. The second surface 44b of the substrate material 44 passes over the tension roller 50 and beneath the idler roller 48. Optionally, the substrate supply station 14 can include a feedback system that automatically maintains constant tension of the substrate material 44. For example, in one embodiment, the tension roller 50 can be equipped with a force sensor 49 for monitoring the magnitude of force applied to the tension roller 50 by the substrate material 44 and relays that information to the unwind encoder 47 for controlling the speed of the substrate material 44, as will be described in more detail below. In alternative embodiments, the tension may be manually set at the beginning of the process and not necessarily automatically controlled throughout the process.

Downstream from the substrate supply station 14 is the alignment station 16. The alignment station 16 operates to align the substrate material 44 in a "Y" direction, which "Y" direction is perpendicular to an "X" direction, which "X" direction is a direction of travel of the substrate material 44 through the alignment station 16. The alignment station 16 includes a web guide 52 and an edge guide sensor 54. The web guide 52 includes a pair of guide rollers 52a, 52b, the axial position, for example, and orientation of each of which can be adjusted to adjust the position of the substrate material 44 as it passes through the alignment station 16 on its way to the lamination station 18. The edge guide sensor 54 can include a sensor such as an optical sensor, for example, that detects the orientation and/or position of either or both edges of the substrate material 44 as it passes therethrough. Based on this detection, the edge guide sensor can send a signal to the web guide 52 to adjust the alignment of the substrate material 44, as necessary.

As shown in FIG. 1, the system 10 can further be equipped with a coating station 56 located in the vicinity of the alignment station 16 and upstream from the lamination station 18. The coating station 56 can include a reservoir 60 and an applicator 58 such as a roller, for example, that applies an anti-static material to the second surface 44b of the substrate material 44 prior to the substrate material 44 entering the lamination station 18. In one embodiment, the anti-static material can include a water-based anti-static material that is applied to the second surface 44b of the substrate material 44 in such a small amount that it may be air dried prior to the substrate material 44 entering the lamination station 18.

The lamination station 18 of the presently disclosed system 10 includes a lamination roller 62 and a print station 64. The lamination roller 62 is disposed adjacent to the drive drum 32.

The lamination roller 62 and the drive drum 32 define a nip 65 that receives the film material 28 from the drive drum 32 and the substrate material 44 from the alignment station 16 for lamination. The lamination roller 62 is operative to apply a force against the drive drum 32 while the film material 28 and substrate material 44 pass through the nip 65 and the lamination station 18. The force facilitates lamination of the first surface 44a of the substrate material 44 to the first surface 28a of the film material 28, thereby producing the aforementioned continuous web of laminate 68. In some embodiments, the amount of force applied by the lamination roller 62 can be adjusted as desired to accommodate any given process parameter.

In embodiments where the substrate material 44 includes the roll set curl C1 discussed above, in the absence of tension, the laminate 68 can also include a roll set curl C2 in the same direction as the curl C1 of the substrate material 44, i.e., in a direction toward the first surface 44a of the substrate material 44 of the laminate 68. The curl C2 in the laminate 68 can have a magnitude that is equal to a magnitude of the curl C1 of the substrate material 44 prior to lamination or, in some embodiments, the curl C2 in the laminate 68 can have a magnitude that is less than a magnitude of the curl C1. That is, in some embodiments, the process undergone in the lamination station 18 can reduce the curl C1 in the substrate material 44. As such, said another way, the curl C2 in the laminate can be less than or equal to the curl C1 in the substrate material 44; or the curl C2 in the laminate 68 is at least a portion of the curl C1 in the substrate material 44. In still other embodiments, the curl C2 in the laminate 68 can be greater than or equal to the curl C1 in the substrate material 44.

As mentioned, the lamination station 18 also includes the printing station 64. The printing station 64 can include first and second product markers 66a, 66b disposed on opposite sides of the laminate 68 produced by the lamination station 18. Additionally, as illustrated in FIG. 1, the printing station 64 of the present embodiment includes at least a pair of idler rollers 70a, 70b disposed on opposite sides of the product markers 66a, 66b to assist in guiding the laminate 68 through the printing station 64. The first product marker 66a can include a printer such as an ink jet printer or a laser printer, for example, for printing production information such as a job number, a stack number, a batch number, or any other desired information on the second surface 28b of the film material 28 of the laminate 68, as the laminate 68 passes through the printing station 64. Similar to the first product marker 66a, the second product marker 66b can include a printer such as an ink jet printer or a laser printer, for example, for printing production information such as a job number, a stack number, a batch number, or any other desired information on the second surface 44b of the substrate material 44 of the laminate 68, as the laminate 68 passes through the printing station 64.

Downstream from the printing station 64 of the lamination station 18 of the present embodiment of the system 10 is located the breaker bar station 20. So configured, the laminate 68 travels directly from the lamination station 18 to the breaker bar station 20 without interruption. That is, the laminate 68 is neither rolled, cut, stored, nor otherwise moved off-line away from the system 10 as it moves from the lamination station 18 to the breaker bar station 20. Said another way, the breaker bar station 20 of the present embodiment is disposed in-line with the lamination station 18, and the remainder of the system 10.

As mentioned above, the breaker bar station 20 is adapted to curl, bend, deform, and/or otherwise manipulate the continuous web of laminate 68 so as to counter, offset, reduce and/or eliminate the curl C2 and provide a substantially flattened laminate 70. To achieve this objective, the breaker bar station 20 of the present embodiment includes an idler roller 72 and an elongate bar 74 disposed downstream from the idler roller 72.

The idler roller 72 and elongate bar 74 each includes a longitudinal axis disposed perpendicular to the direction of travel of the continuous web of laminate 68 from the lamination station 18. The breaker bar station 20 receives the laminate 68 such that the second surface 28b of the film material 28 of the laminate 68 engages the idler roller 72 and the idler roller 72 redirects the laminate 68 to the elongate bar 74. The elongate bar 74 includes an elongate member constructed of metal, plastic, wood, or generally any other suitable, relatively rigid, material, and it has a working surface 76. During operation, the elongate bar 74 is generally fixed in position against rotation or otherwise such that the second surface 44b of the substrate material 44 of the continuous web of laminate 68 slides around the working surface 76. The sliding of the laminate 68 around the working surface 76 causes the laminate 68 to bend, curl, or otherwise deform around the elongate bar 64 in a direction toward the first surface 28a of the film material 28 of the laminate 68, thereby introducing a temporary curl C3 to the laminate 68. The curl C3 introduced by the elongate bar 64 is in a direction that is opposite to the curl C2 of the laminate 68, as received from the lamination station 18. Accordingly, the curl C3 introduced by the breaker bar station 20 is designed to offset the curl C2 in the continuous web of laminate 68 to produce the substantially flattened laminate 70 mentioned above. The substantially flattened laminate 70 preferably has zero curl, or curl within acceptable tolerances for any given set of processing parameters, for example.

The working surface 76 of the disclosed embodiment of the elongate bar 64 includes a rounded surface, which can also be referred to as a bull-nosed surface, with a predetermined radius of curvature. The rounded surface can be designed such that the elongate bar 74 does not scratch, tear, or otherwise damage the laminate 68 as it slides against the elongate bar 74. Friction generated by the laminate 68 sliding against the rounded surface 76 can beneficially assist in reducing and/or eliminating the curl C2 and introducing the curl C3 discussed above. While the working surface 76 has been described as rounded, in alternative embodiments, the working surface 76 can have generally any shape suitable for the intended purpose.

In the present embodiment, the orientation of the substrate material 44 and the film material 28 of the laminate 68 further this objective because it is the second surface 44b of the substrate material 44 that slides over the working surface 76 of the elongate bar 64. As described above, the substrate material 44 can generally include a material such as paper or plastic, for example, having a thickness in the range of approximately 2 mils (50.8 µm) to approximately 24 mils (601.6 µm), while the film material 28 can generally include any material such as a paper material, a plastic material, a metal material, a metalized material, etc. having a thickness that is much thinner than the substrate material 44, e.g., in a range of approximately 0.25 mils (6.35 µm) to approximately 2 mils (50.8 µm). As such, the substrate material 44 is inherently better equipped to resist scratching, scraping, or tearing due to frictional forces generated between the laminate 68 and the elongate bar 64. While the present embodiment of the system 10 has been described in a manner that the substrate material 44 slides over and directly contacts the elongate bar 64 of the breaker bar station 20, the scope of the present disclosure is not limited to this configuration. Rather, alternative embodiments of the system 10 could be arranged and configured such that the film material 28 slides over and directly contacts the elongate bar 74.

In some embodiments, the position of the elongate bar 74 relative to the idler roller 72 can be adjustable so as to adjust the degree to which the continuous web of laminate 68 is bent, curled, or manipulated around the elongate bar 74. For example, as mentioned, the elongate bar 74 includes an elongate member disposed generally perpendicular to a direction of travel of the laminate 68 from the lamination station 18. So configured, the elongate bar 74 includes a longitudinal axis A, which extends into and out of the page relative to the orientation of FIG. 1, and around which the laminate 68 curls and passes as it traverses the breaker bar station 20. For example, in order to increase the magnitude of the curl C3 introduced to the laminate 68, the elongate bar 74 could be moved in a direction perpendicular to the longitudinal axis A closer to the idler roller 72. In this manner, a radius of curvature of a travel path for the laminate 68 through the breaker bar station 20 can potentially be reduced, thereby imposing more curl on the laminate 68. Similarly, to decrease the magnitude of the curl C3 introduced to the laminate 68, the elongate bar 74 could be moved in a direction perpendicular to the longitudinal axis A further away from the idler roller 72. In this manner, a radius of curvature of a travel path for the laminate 68 through the breaker bar station 20 can be increased, thereby imposing less curl on the laminate 68. In other embodiments, to adjust or change the magnitude of the curl C3 introduced to the laminate 68 by the breaker bar station 20, the elongate bar 74 can be switched out for another elongate bar 74 having a working surface 76 with a different radius of curvature.

Immediately downstream of the breaker bar station 20 is the registration station 22 of the system 10 of the present disclosure. So configured, the laminate 68 travels directly from the breaker bar station 20 to the registration station 22 without interruption. That is, the laminate 68 is neither rolled, cut, stored, or otherwise moved off-line away from the system 10 as it moves from the breaker bar station 20 to the registration station. Said another way, the registration station 22 of the present embodiment is disposed in-line with the breaker bar station 20, and the remainder of the system 10.

The presently disclosed embodiment of the registration station 22 includes a sensor 78, a drive roller 80, and an idler roller 82. The sensor 78 can include an optical sensor such as an electric eye, a charge-coupled-device (CCD), a complementary metal-oxide semiconductor (CMOS), or generally any other suitable sensor, optical or otherwise. During an automated registration mode, the sensor 78 is adapted to sense an identifying mark carried by the film material 28 of the laminate 68 and to transmit a signal to the sheeter station 24 to indicate to the sheeter station 24 when to cut the laminate 68, as will be discussed in more detail below. The identifying mark carried by the laminate 68 can include a water mark, a cross hatch, or any other mark carried by the film material 28. In some embodiments, the film material 28 can be embedded with a specific material such as a magnetic particle to be sensed by the sensor 78 as it passes through the registration station 22. In other embodiments, the film material 28 may not include identifying markings, but rather, may be monochromatic, uniformly transparent, or uniformly translucent, for example. In such instances, the system 10 can be set to operate in a manual mode that does not rely on detection of identifying markings to achieve registration. Instead, as mentioned above, the system 10 may operate in a manual registration mode wherein the system 10 is set to monitor one or more system parameters and to cut the laminate 68 into sheets of desired dimension, as will be described more fully below.

The drive roller 80 and the idler roller 82 of the registration station 22 are disposed on opposite sides of the continuous web of laminate 68 as it travels downstream from the sensor 78. As such, the drive roller 80 and idler roller 82 of the present disclosure are disposed immediately upstream from the sheeter station 24. That is, the laminate 68 moves directly from the drive roller 80 and idler roller 82 to the sheeter station 24 without interruption. The drive roller 82 is adapted to be driven to move the laminate 68 from the registration station 22 to the sheeter station 24. The drive roller 82 can be equipped with a motor (not shown) and a drive encoder 84 for controlling the speed of the drive roller 80 to ensure that the laminate 68 travels at constant speed and tension between the lamination station 18 and the sheeter station 24, as will be described in more detail below. The idler roller 82 is free to roll according to the speed of travel of the laminate 68 toward the sheeter station 24.

The sheeter station 24 of the presently disclosed system 10 is disposed immediately downstream from the registration station 22 and, as mentioned above, is adapted to cut the laminate 68 into the individual sheets 1 of predetermined dimensions. The terms "immediately downstream" and "immediately upstream," as used throughout the present disclosure, means that there are no intervening components disposed between such "immediately"" upstream or downstream components. Accordingly, the processing material such as the laminate 68, for example, moves directly between such immediately upstream or downstream components. While the sheeter station 24 of the present embodiment is disclosed as being disposed immediately downstream of the registration station 22, alternative embodiments could be arranged differently, e.g., with one or more intervening components, as may be desired for any suitable purpose.

As depicted, the present embodiment of the sheeter station 24 includes a cutting drum 86 and a pair of rollers 88a, 88b. The cutting drum 86 is a generally cylindrical drum driven by a motor (not shown) and equipped with a cutting encoder 90 and a knife 92. The cutting encoder 90 is for communicating with the sensor 78 of the registration station 22, any one or more of the other encoders of the system 10, and/or a central controller for controlling the rotation of the cutting drum 86, thereby controlling when the knife 92 is to cut the continuous web of laminate 68. While the knife 92 of the presently disclosed embodiment is disclosed as being carried by the cutting drum 86, alternative embodiments of the system 10 can include alternative cutting means known in the art such as a flying knife, for example.

In the present embodiment, the pair of rollers 88a, 88b are disposed immediately downstream of the cutting drum 86 for moving the individual sheets 1 from the sheeter station 24 to the stacking station 26. In one embodiment, one of the rollers 88a, 88b can be driven by a motor (not shown) for pulling the sheets 1 from the cutting drum 86. In some embodiments, the driven roller 88a, 88b can pull the sheets 1 at a speed that is faster than the speed at which the continuous web of laminate 68 travels from the lamination station 18 to the sheeter station 24 such that the rollers 88a, 88b can cleanly take the sheets 1 away from the cutting drum 86. For example, in one embodiment, the rollers 88a, 88b can take the sheets 1 away from the cutting drum 86 at a speed that is in a range of approximately 1 foot per minute to approximately 5 feet per minute faster than the travel of the web of laminate 68 to the sheeter station 24. In one preferred embodiment, the rollers 88a, 88b can take the sheets 1 away at a rate of approximately 3 feet per minute faster than the speed of the laminate 68. In one embodiment, the rollers 88a, 88b can be equipped with a nip encoder 94 for controlling the rotational speed thereof relative to the speed of the continuous laminate 68 to ensure that the individual sheets 1 are taken away at an increased rate, as just described.

The stacking station 26 includes a transport conveyor 96 and a delivery conveyor 98. The transport conveyor 96 is disposed immediately downstream from the pair of rollers 88a, 88b of the sheeter station 24 for moving the individually cut sheets 1 toward the delivery conveyor 98. The delivery conveyor 98 includes opposing upper and lower belt conveyors 98a, 98b disposed on opposite sides of the individual sheets 1. The delivery conveyor 98 is adapted to move the individual sheets 1 into a stack 100 of individual sheets 1. In one embodiment, the delivery conveyor 98 includes a delivery encoder 102 in communication with one or more of the other encoders of the system and/or a central controller for controlling the speed of the delivery conveyor 98 to achieve the stack 100.

Figure 2:
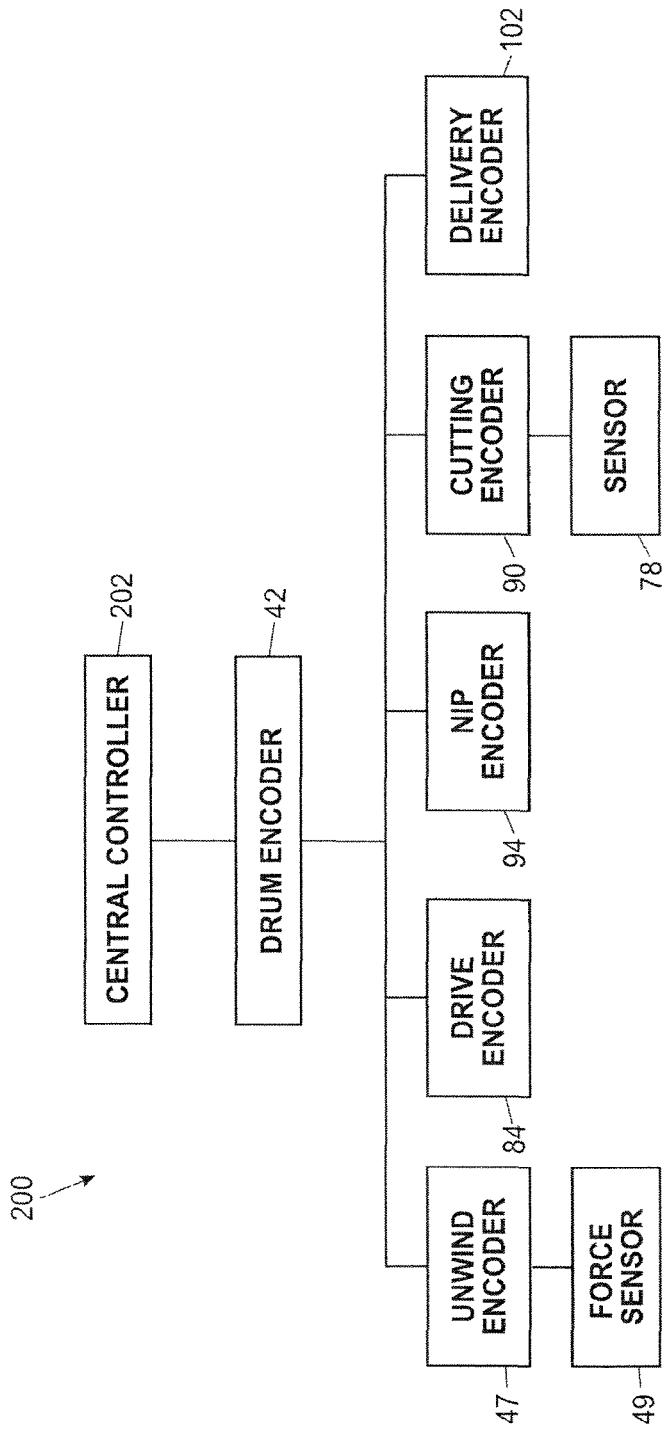
FIG. 2 is a block diagram schematically illustrating an embodiment of a control system of a laminating system constructed in accordance with the principles of the present disclosure.

As described above, the system 10 disclosed with reference to FIG. 1 can include a plurality of sensors, motors, and encoders for controlling and/or monitoring the operation of the system 10. In combination, these components are arranged to define a control system 200. FIG. 2 depicts a block diagram of one embodiment of a control system 200. The control system 200 includes a central controller 202, the drum encoder 42 of the film supply station 12, the unwind encoder 47 and the force sensor 49 of the substrate supply station 14, the drive encoder 84 and sensor 78 of the registration station 22, the nip encoder 94 and the cutting encoder 90 of the sheeter station 24, and the delivery encoder 102 of the stacking station 26. In one embodiment, the unwind encoder 47, the drive encoder 84, the nip encoder 94, the cutting encoder 90, and the delivery encoder 102 can each communicate directly with the drum encoder 42, as shown. In one embodiment, the drum encoder 42 includes an absolute encoder, while the unwind encoder 47, drive encoder 84, nip encoder 94, cutting encoder 90, and delivery encoder 102 each includes an incremental encoder. The drum encoder 42 can communicate directly with the central controller 202. The central encoder 202 can include a computer including a processor, a RAM, a ROM, a user interface, and/or any other components suitable for the intended purpose. With this configuration, the central controller 202 can facilitate operation of the entire system 10 depicted in FIG. 1 based on information stored in the RAM and/or ROM and/or based on information received from a user via the user interface. For example, for any given operation, a user may input the type of materials being used for the film material 28 and/or substrate material 44, the desired dimensions of the individual sheets 1 to be cut, the desired processing speed, etc. The central controller 202 can then instruct the drum encoder 42 to rotate the drive drum 32 at a particular rotational speed to achieve the desired objectives. The remaining encoders 47, 84, 94, 90, 102 of the present embodiment then control their respective components based on the speed of the drive drum 32. Additionally, as shown and mentioned above, the unwind encoder 47 communicates with the force sensor 49 of the tensioning roller 50 to control the rotational speed of the substrate material 44 based on the magnitude of the force applied to the tension roller 50 by the substrate material 44. That is, if the force sensor 49 detects a force that is greater than some predetermined threshold, the unwind encoder 47 can determine that the rotational speed of the substrate material 44 is too low, and therefore, the unwind encoder 47 can increase the rotational speed of the substrate material 44. Alternatively, if the force sensor 49 detects a force that is less than some predetermined threshold, the unwind encoder 47 can determine that the rotational speed of the substrate material 44 is too high, and therefore, the unwind encoder 47 can decrease the rotational speed of the substrate material 44.

Further still, as shown in FIG. 2, the cutting encoder 90 is also in direct communication with the sensor 78 of the registration station 22. So configured, in the automated registration mode, when the sensor 78 detects the passage of the identifying mark on the laminate 68, the sensor 78 can transmit a signal to the cutting encoder 90. Based on the timing of this signal and the rate at which the continuous laminate 68 travels through the registration station 22, the cutting encoder 90 can ensure that the cutting drum 86 is positioned in the proper orientation such that the knife 92 will cut the laminate 68 at the identifying mark, thereby ensuring that the individual sheets 1 are of desired dimension within appropriate tolerances. In some embodiments, the cutting drum 86 rotates generally continuously and, as such, the cutting encoder 90 can operate to adjust the speed of rotation of the cutting drum 86 to ensure that the knife 92 will cut the web of laminate 68 at the desired locations.

Alternatively, as mentioned above, the system 10 can operate in the manual registration mode. In the manual registration mode, the sheeter station 24 cuts the web of laminate 68 based on a particular input, e.g., a dimension, entered into the system 10 by a technician. The system 10 is then programmed to ensure that the sheeter station 24 cuts the web of laminate 68 at specific locations to produce sheets 1 of specified dimensions. For example, the sheeter station 24 may be programmed to cut the web of laminate 68 every 12", 18", 24", or any other length. In one embodiment, to ensure that the cuts are made as accurately as possible, the central controller 202 substantially continuously monitors the drum encoder 42 and instructs the sheeter station 24 to cut the web of laminate 68 based on an absolute revolution of the drive drum 32. Because the drive drum 32 has a fixed diameter, the central controller 202 can determine the length of the film material 28 that has passed over the drive drum 32 for any given period of time by performing a simple calculation based on the absolute revolution of the drive drum 32, as indicated by the drum encoder 42. The film material 28 ultimately forms a part of the web of laminate 68 fed to and through the sheeter station 24. Accordingly, the central controller 202 can determine the length of the web of laminate 68 that has passed through the sheeter station 24, which is the same as the length of the film material 28 that passes over the drive drum 32. In one embodiment, the drive encoder 42 can send a signal to the central controller 202 up to 10,000 times per revolution, for example, and as such, the central controller 202 can substantially continuously determine the length of the laminate 68 being moved through the system 10 to ensure that the sheeter station 24 cuts the laminate 68 at a precise location.

While the foregoing embodiment identifies the central controller 202 as performing the determination of the length of the laminate 68 passing through the sheeter station 24, in other embodiments, the sheeter station 24 can be equipped with a separate controller such as a programmed logic controller (PLC), for example, for performing this determination. In such a configuration, the drum encoder 42 could send signals directly to the PLC of the sheeter station 24 such that the length of the laminate 68 between cuts could be calculated by the sheeter station 24 instead of the central controller 202. Moreover, while the foregoing embodiment is described as calculating the length of the laminate 68 based on the absolute revolution of the drive drum 32, other embodiments could make a similar determination based on revolutions of a different drum or roller of the system 10 such as the drive roller 80 of the registration system 22, for example, or any other drum or roller equipped with or capable of being equipped with an encoder or other suitable device.

Still referring to FIG. 2, only the drum encoder 42 is illustrated as being in direct communication with the central controller 202, but in alternative embodiments, any or all of the other encoders 47, 84, 94, 90, 102 and/or sensors 49, 78 can also be in direct communication with the central controller 202. In some embodiments, all of the encoders 47, 84, 94, 90, 102 communicate with each other through the central controller 202. In still other embodiments, any or all of the encoders 47, 84, 94, 90, 102 can communicate directly with each other.

Figure 3:
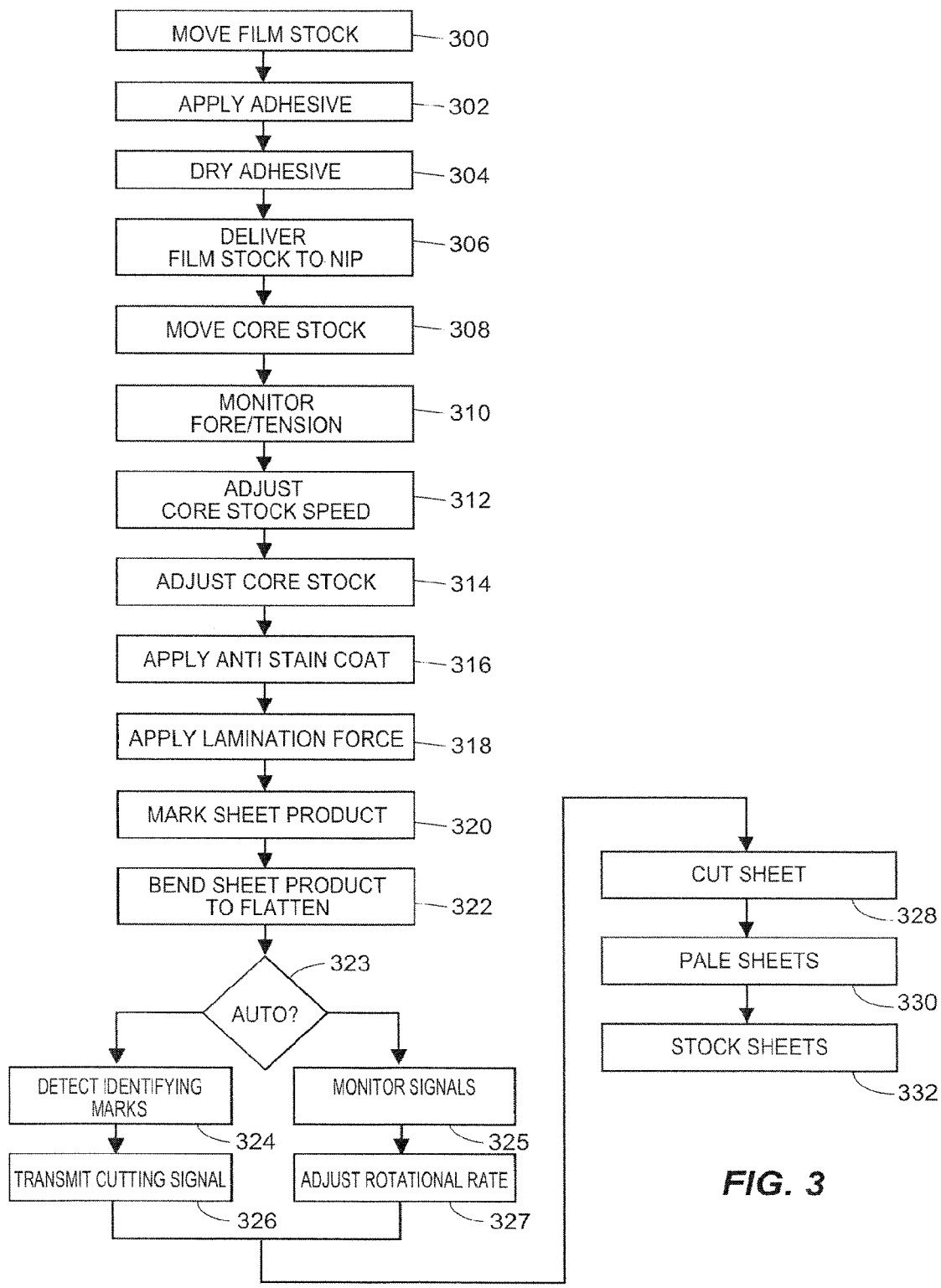
FIG. 3 is a flowchart illustrating the steps of one embodiment of a method or process of handling material in accordance with the principles of the present disclosure.

With the system 10 arranged and configured as described above with reference to FIGS. 1 and 2, reference will now be made to the flowchart depicted in FIG. 3 to describe one embodiment of the operation of the system 10. At block 300 of FIG. 3, the drive drum 32 pulls the film material 28 from the roll stored on the shaft 36 of the film supply station 12 and moves the film material 28 to the nip 65 of the lamination station 18. The rate at which the drive drum 32 rotates can be dictated by the central controller 202, for example. As the film material 28 is removed from the shaft 36, the film coating station 30 applies an adhesive to the first surface 28a of the film material 28, as illustrated at block 302. The film material 28 then travels around the drive drum 32 and past the drying oven 34, as illustrated at block 304, where any water carried by the adhesive is evaporated. Finally, the drive drum 32 delivers the coated film material 28 to the nip 65 of the lamination station 18, as illustrated at block 306.

Simultaneously with the movement of the film material 28, the substrate material 44 is also moved to the nip 65 of the lamination station 18 by way of the unwind shaft 45 and tensioning device 46, as indicated by block 308. That is, the unwind shaft 45 rotates the roll of substrate material 44 to deliver the substrate material 44 to the tensioning device 46. The rate at which the unwind shaft 45 rotates can be based on the rate at which the drive drum 32 rotates, which can be communicated to the unwind shaft 45 via the unwind encoder 47 and the drum encoder 42, for example. Additionally, as discussed above, the rate at which the unwind shaft 45 rotates can be based on a signal received from the tensioning device 46 and, more particularly, based on a signal received from the force sensor 49 of the tensioning device 46. As such, throughout operation of the system 10, the force sensor 49 can generally continuously and/or intermittently monitor the force applied to the tension roller 50, as indicated at block 310, thereby enabling the control system 200 to continuously and/or intermittently monitor and/or adjust the rotational speed of the unwind shaft 45 if necessary, as indicated at block 312.

As the substrate material 44 exits the tensioning device 46, it travels downstream through the alignment station 16 where the web guide 52 and edge guide sensor 54 cooperate to align the substrate material 44, as indicated at block 314, immediately prior to entering the nip 65 of the lamination station 18. In some embodiments, and as described above with reference to FIG. 1, the second surface 44b of the substrate material 44 may further be coated with an anti-static coating by the coating station 56 prior to entering the nip 65 of the lamination station 18, as indicated at block 316.

As the film material 28 and the substrate material 44 enter the nip 65 of the lamination station 18, the lamination roller 62 applies a force against the drive drum 32 to laminate the first surface 44a of the substrate material 44 to the first surface 28a of the film material 28, as indicated at block 318. This lamination step produces the continuous web of laminate 68, as described above.

The continuous web of laminate 68 is then moved through the print station 64 where the first and second product markers 66a, 66b can mark each side thereof with product identifying information or any other desired information, as indicated at block 320 and described above. The print station 64 and marking steps are optional features.

After passing through the optional print station 64, the continuous web of laminate 68 can be moved to the breaker bar station 20 where it is substantially flattened by bending the laminate 68 around the idler roller 72 and the elongate bar 74 to introduce the curl C3 to counter the curl C2 in the laminate 68 as a result of the roll set curl C1 of the substrate material 44, as indicated at block 322.

The flattened laminate 68 then travels through the registration station 22. At block 323 it is determined whether the system 10 is operating in the automated registration mode or the manual registration mode, as discussed above. If operating in the automated registration mode, the sensor 78 detects the presence of identifying markings on the second surface 28b of the film material 28, as indicated at block 324. Upon detecting an identifying marking, the sensor 78 transmits a signal to the sheeting station 24 and, more particularly, to the cutting encoder 90, as indicated at block 326. The cutting encoder 90 then ensures that the cutting drum 86 is being driven at a speed sufficient to ensure that the knife 92 carried by the cutting drum 86 cuts the continuous web of laminate 68 approximately directly at the identifying mark on the laminate 68 within acceptable tolerances, as indicated at block 328, thereby providing the individual sheets 1. However, if the system 10 is operating in the manual registration mode, the laminate 68 merely passes through the registration station 22 and onto the sheeter station 24 where the cutting encoder 90 is continuously receiving signals from the central controller 202 or the drive encoder 42, for example, indicative of the absolute revolution of the drive drum 32 since the last cut was made and/or indicative of the length of the amount of the film material 28 that has passed over the drive drum 32. As shown at block 325, the cutting encoder 90 or a PLC of the sheeter station 24, for example, is configured to continuously receive these signals and monitor the position of the cutting drum 86 and associated knife 92. If necessary, the cutting encoder 90 or PLC of the sheeter station 24 can adjust the rotation of the cutting drum 86, as shown at block 327, to ensure that the knife 92 cuts the laminate 68 at the desired location based on the signals received, as indicated at block 328.

Once the individual sheets 1 are cut with the knife 92, the pair of rollers 88a, 88b pull the sheets 1 away from the cutting drum 86 and onto the transport conveyor 96, as indicated at block 330. The transport conveyor 96 then transfers the sheets 1 to the delivery conveyor 98 to be ejected into the stack 100 shown in FIG. 1, as indicated at block 332.

Throughout the foregoing process, the present system 10 advantageously maintains desired speed and/or tension of the film material 28, the substrate material 44, the continuous web of laminate 68, and the individual sheets 1 due to the incorporation of the control system 200.

Moreover, the presently disclosed system 10 advantageously provides highly accurate registration of the individual sheets 1 by way of the registration station 22 including the sensor 78 in communication with the cutting drum 86 of the sheeting station 24 or by way of monitoring the rotation of the drive drum 32, for example, to determined the appropriate location to cut to the web of laminate 68 based on the length of the laminate 68 that has passed through the system 10 between cuts. For example, in the disclosed automated registration mode embodiment, the sensor 78 of the registration station 22 is in close proximity to the cutting drum 86 and its associated cutting encoder 90. This close proximity enables the components to work in very quick conjunction with each other, thereby resulting in very precise, accurate, and repeatable registered cuts to produce individual sheets 1 with very accurate dimensions with smaller tolerances than previously known systems. Another advantage of the disclosed system 10 is that the sensor 78 of the registration station 22 is disposed in a location such as to detect identifying markings on the film material 28 after the film material 28 and the substrate material 44 have been laminated to form the continuous web of laminate 68. As such, the system 10 can accurately identify the precise location to cut the continuous laminate 68.

Numerous additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed:

1. A method of making a laminated product, the method comprising:
    moving substrate material from a roll through a nip disposed between a drive drum and a laminating roller, the substrate material having a first surface and a second surface disposed opposite the first surface;
    moving film material from a roll through the nip, the film material having a first surface and a second surface;
    applying a force to the substrate material and the film material with the laminating roller as the substrate material and film material move through the nip, thereby facilitating lamination of the first surface of the substrate material to the first surface of the film material to provide a continuous web of laminate;
    bending and sliding the continuous web of laminate around an elongate bar that is disposed downstream from the nip to provide a continuous web of substantially flattened laminate;
    determining when to cut the continuous web of substantially flattened laminate to provide individual sheets of a predetermined dimension by either:
        (i) detecting passage of a marking on the continuous web of substantially flattened laminate with an optical sensor substantially immediately prior to cutting the continuous web of substantially flattened laminate; or
        (ii) monitoring an absolute revolution of the drive drum and calculating a length of the continuous web of substantially flattened laminate that has passed through a sheeter station.

2. The method of claim 1, further comprising moving the continuous web of laminate without interruption from the nip to the elongate bar.

3. The method of claim 1, further comprising: determining when to cut the continuous web of substantially flattened laminate to provide individual sheets of a predetermined dimension; and cutting the continuous web of substantially flattened laminate with the sheeter station to provide the individual sheets of the predetermined dimension.

4. The method of claim 1, further comprising sending a signal to the sheeter station instructing the sheeter station to cut the continuous web of substantially flattened laminate, the signal based on when the optical sensor detected the passage of the marking.

5. The method of claim 1, further comprising moving the continuous web of substantially flattened laminate without interruption directly between the optical sensor and the sheeter station.

6. The method of claim 1, further comprising aligning the substrate material in a direction substantially perpendicular to a direction of travel at a location downstream from the roll of substrate material and upstream from the nip.

7. The method of claim 1, wherein bending and sliding the continuous web of laminate around the elongate bar comprises sliding the second surface of the substrate material of the continuous web of laminate around the elongate bar.

8. A method of making a laminated product, the method comprising:
    moving substrate material from a roll through a nip disposed between a drive drum and a laminating roller, the substrate material having a first surface and a second surface disposed opposite the first surface;
    moving film material from a roll through the nip, the film material having a first surface and a second surface;
    applying a force to the substrate material and the film material with the laminating roller as the substrate material and film material move through the nip, thereby facilitating lamination of the first surface of the substrate material to the first surface of the film material to provide a continuous web of laminate;
    determining when to cut the continuous web of laminate to provide individual sheets of a predetermined dimension;
    cutting the continuous web of laminate with a sheeter station to provide individual sheets of the predetermined dimension; and
    wherein determining when to cut the continuous web of substantially flattened laminate comprises either:
        (i) detecting passage of a marking on the continuous web of substantially flattened laminate with an optical sensor substantially immediately prior to cutting the continuous web of substantially flattened laminate; or
        (ii) monitoring an absolute revolution of the drive drum and calculating a length of the continuous web of substantially flattened laminate that has passed through a sheeter station.

9. The method of claim 8, further comprising sending a signal to a sheet cutter to cut the continuous web of laminate, the signal based on then the optical sensor detected the passage of the marking.

10. The method of claim 9, further comprising moving the continuous web of substantially flattened laminate without interruption directly between the optical sensor and the sheet cutter.

11. The method of claim 8, further comprising bending and sliding the continuous web of laminate around an elongate bar disposed downstream of the nip to provide a substantially flattened continuous web of laminate.

12. The method of claim 11, further comprising moving the continuous web of laminate without interruption from the nip to the elongate bar.

13. The method of claim 8, further comprising aligning the substrate material in a direction substantially perpendicular to a direction of travel at a location downstream from the roll of substrate material and upstream from the nip.

* * * * *